(12) United States Patent
Kojima

(10) Patent No.: US 8,670,805 B2
(45) Date of Patent: Mar. 11, 2014

(54) MOBILE STATION AND WIRELESS BASE STATION SIDE PAGING CONTROL DEVICE IN WIRELESS COMMUNICATION SYSTEM

(75) Inventor: Yuji Kojima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 512 days.

(21) Appl. No.: 12/697,924

(22) Filed: Feb. 1, 2010

(65) Prior Publication Data

US 2010/0137007 A1   Jun. 3, 2010

Related U.S. Application Data

(63) Continuation of application No. PCT/JP2007/000871, filed on Aug. 10, 2007.

(51) Int. Cl.
*H04M 1/00*   (2006.01)

(52) U.S. Cl.
USPC ........... 455/574; 455/458; 455/515; 370/311; 370/470

(58) Field of Classification Search
USPC ........... 455/458, 567, 334, 343.1–343.5, 574, 455/426.1, 515, 422.1, 450–455, 464, 509, 455/436–444, 432.1–434; 713/400–600; 370/395.4, 350, 503–520, 470, 498, 370/310, 311, 339, 341–348, 431–463, 370/321–337; 375/354–370
See application file for complete search history.

(56) References Cited

U.S. PATENT DOCUMENTS

| | | | |
|---|---|---|---|
| 5,896,374 A * | 4/1999 | Okumura et al. | 370/311 |
| 7,630,729 B2 * | 12/2009 | Kim et al. | 455/515 |
| 2002/0006805 A1 | 1/2002 | New et al. | |
| 2005/0035555 A1 | 2/2005 | Peterson et al. | |
| 2005/0043024 A1 * | 2/2005 | Shiga | 455/428 |
| 2006/0025134 A1 * | 2/2006 | Cho et al. | 455/435.1 |
| 2006/0203766 A1 | 9/2006 | Kim et al. | |
| 2007/0042814 A1 | 2/2007 | Kakimoto et al. | |
| 2007/0064662 A1 * | 3/2007 | Bultan et al. | 370/338 |

FOREIGN PATENT DOCUMENTS

| | | |
|---|---|---|
| JP | 06141365 | 5/1994 |
| JP | 2003289576 | 10/2003 |
| JP | 2004241868 | 8/2004 |
| JP | 2004247801 | 9/2004 |

(Continued)

OTHER PUBLICATIONS

Korean Office Action dated Apr. 14, 2011, in corresponding Korean Patent Application No. 10-2010-7002780.

(Continued)

*Primary Examiner* — Ronald Eisner
(74) *Attorney, Agent, or Firm* — Smith, Gambrell & Russell, LLP

(57) ABSTRACT

In a system in which a reception (paging) cycle is defined by number of frames, even if length of the frames is changed, power consumption of a mobile station (MS) and a delay in response at the time of incoming are maintained by changing the paging cycle so that the paging cycles become equal in a time unit. The mobile station for receiving the signal from a wireless base station for each cycle defined by the number of frames to detect an incoming notification has a measurement unit for detecting a change in the frame length of received frames, a cycle changing unit for, if the change is detected, increasing or decreasing the number of frames which defines the cycle, and an incoming notification monitoring unit for receiving the signal from the wireless base station in accordance with the cycle changed by the cycle changing unit.

6 Claims, 13 Drawing Sheets

(56) References Cited

FOREIGN PATENT DOCUMENTS

| | | |
|---|---|---|
| JP | 2005057394 | 3/2005 |
| JP | 2005057787 | 3/2005 |
| JP | 2005079660 | 3/2005 |
| KR | 1020020049765 | 6/2002 |

OTHER PUBLICATIONS

International Search Report dated Oct. 23, 2007, from the corresponding International Application No. PCT/JP2007/000871.

Extended European Search Report dated Mar. 12, 2013 received in Application No. 07790358.1-1854.

* cited by examiner

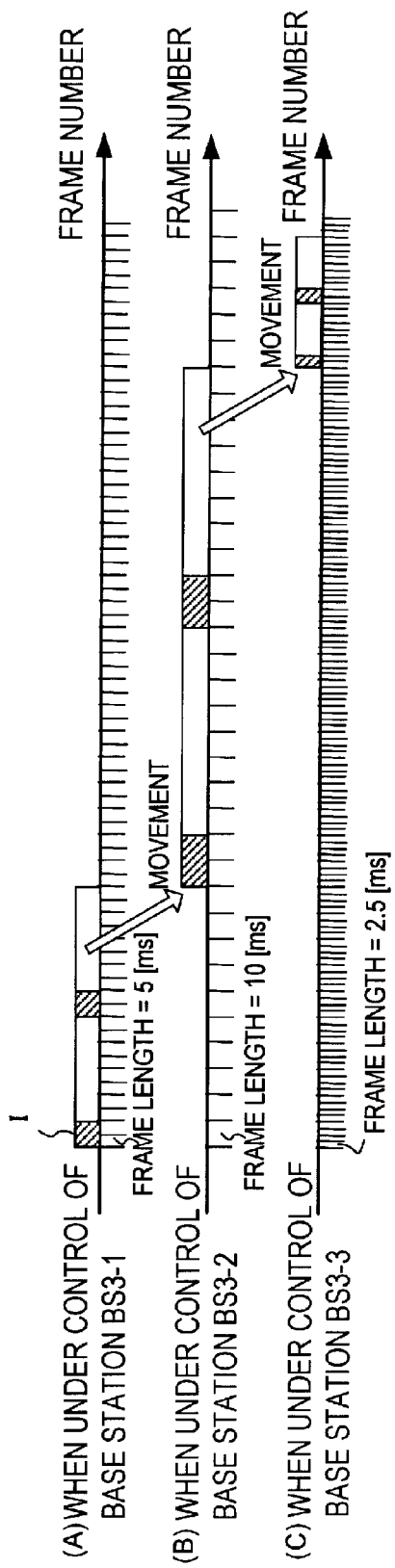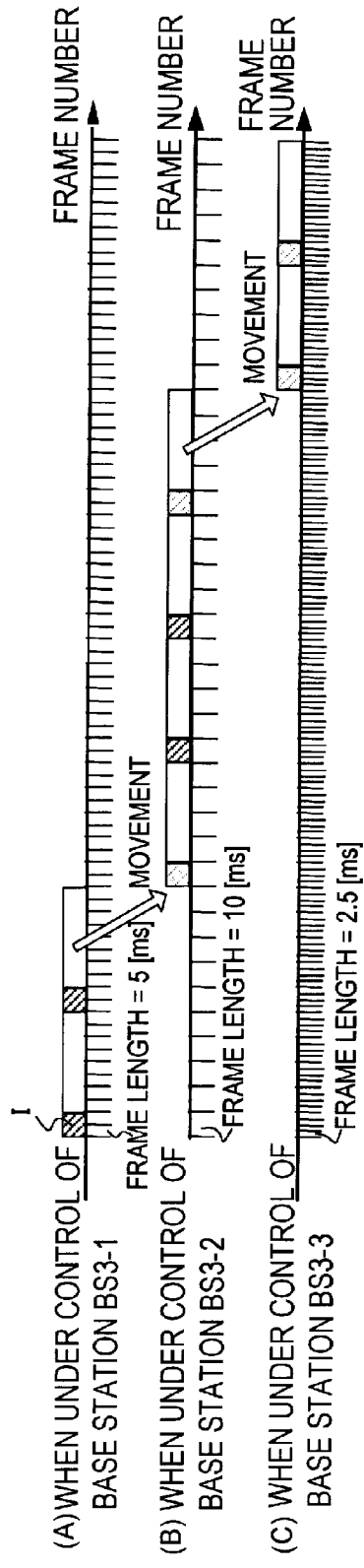

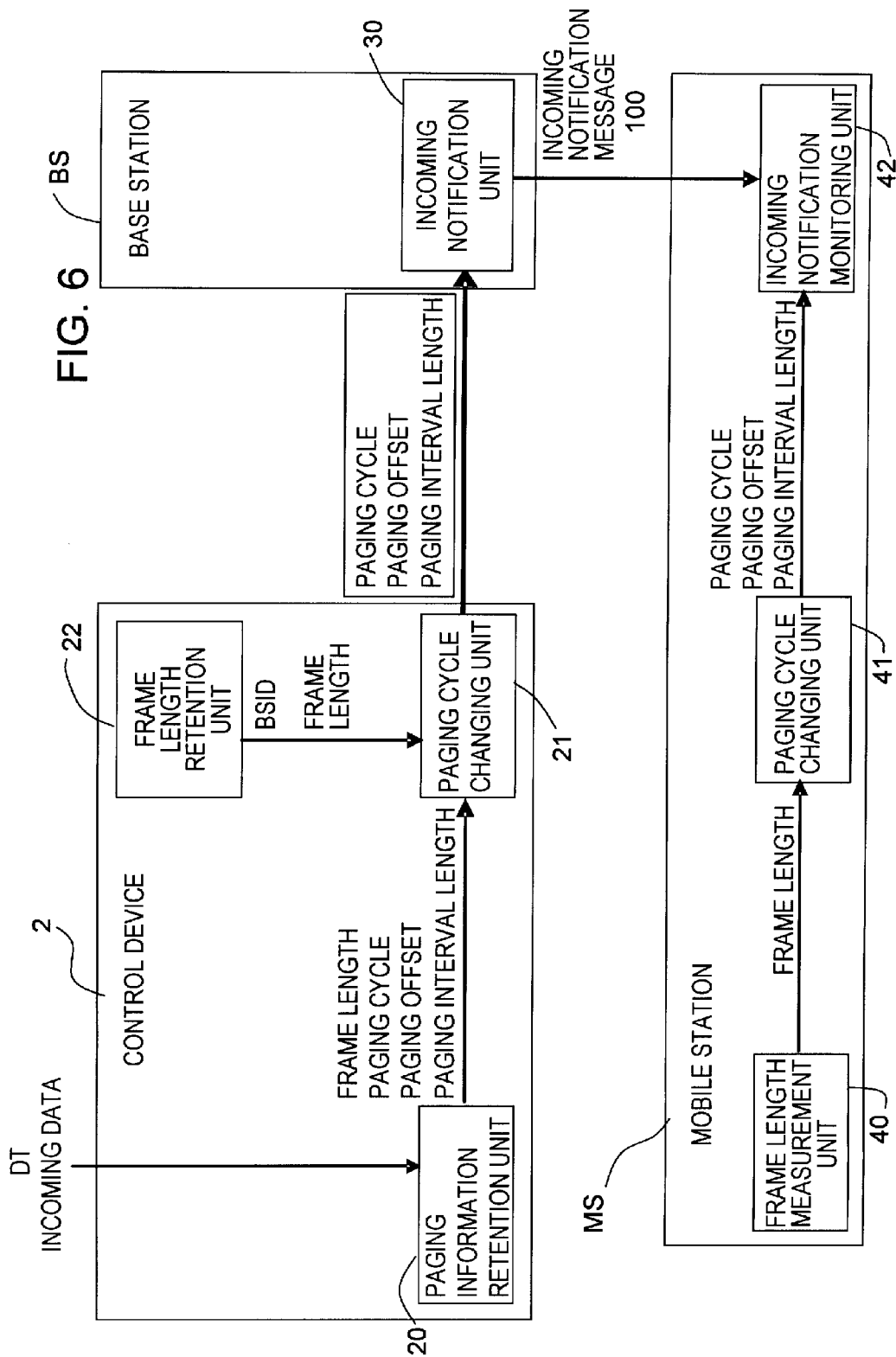

FIG. 10

| MSID | A: PAGING CYCLE [frame] | B: PAGING OFFSET [frame] | C: PAGING INTERVAL LENGTH [frame] | D: FRAME LENGTH[ms] |
|---|---|---|---|---|
| MSID1 | 10 | 2 | 2 | 5 |
| MSID2 | 8 | 7 | 1 | 10 |
| MSID3 | 15 | 1 | 4 | 2.5 |

FIG. 12

| MSID | A: PAGING CYCLE [frame] | B: PAGING OFFSET [frame] | C: PAGING INTERVAL LENGTH [frame] |
|---|---|---|---|
| MSID1 | 10 | 2 | 2 |
| MSID2 | 8 | 7 | 1 |
| MSID3 | 15 | 1 | 4 |

MOBILE STATION AND WIRELESS BASE STATION SIDE PAGING CONTROL DEVICE IN WIRELESS COMMUNICATION SYSTEM

CROSS-REFERENCE TO RELATED APPLICATIONS

This application is a continuation of international application PCT/JP2007/000871, filed on Aug. 10, 2007.

FIELD

The present invention relates to a mobile station and to a wireless base station side device including a wireless base station in a wireless communication system.

BACKGROUND

The Institute of Electrical and Electronic Engineers (IEEE) has recently been proceeding with standardization of a wireless communication system known as Worldwide Interoperability for Microwave Access (WIMAX).

WIMAX consists of IEEE standard 802.16d targeted at stationary subscriber stations and IEEE standard 802.16e targeted at mobile subscriber stations (mobile stations: MS).

FIG. 1 is a drawing depicting an example of the network configuration of a wireless communication system. The network configuration depicted in FIG. 1 is composed of a core network 1, access network AN, which includes a control device 2 and a plurality of wireless base stations BS3-1 to BS3-3 connected to the control device 2 (to be simply referred to as wireless base stations BS unless specified individually), and a mobile station MS.

Furthermore, although the control device 2 is depicted independently from the plurality of wireless base stations BS in the system, the system can also be configured so that the function of the control device 2 is provided within any one of the plurality of wireless base stations BS. Thus, the control device 2 can be understood within the concept of being a wireless base station side device.

A mobile station MS in the idle mode is not registered in units of specific wireless base stations BS, but rather monitors incoming notification messages (paging messages) 100 transmitted by all wireless base stations within paging groups PG (also referred to as a paging area, location area or location registration area) 4-1, 4-2 and 4-3 (to be simply referred to as paging groups PG unless specified individually), and confirms the presence of traffic addressed to the mobile station MS at a fixed cycle.

Since frames targeted for monitoring of incoming notifications are defined intermittently, a mobile station MS is able to reduce power consumption by pausing reception during frame periods of frames other than the frames targeted for monitoring of incoming notifications.

Since a mobile station MS in the idle mode does not register terminal information to a specific wireless base station BS, as long as the mobile station MS is moving within the same paging group PG, it is not necessary to carry out re-registration even if the mobile station MS has moved between wireless base stations BS.

In the case a mobile station MS in the idle mode moves to a different paging group PG (for example, from paging group PG4-1 to paging group PG4-2), the mobile station MS in the idle mode carries out location registration updating processing and registers the paging group PG to which it currently belongs in the control device 2.

The control device 2 has a paging controller and a location register, manages a plurality of wireless base stations BS, and manages to which paging group PG a mobile station MS in the idle mode belongs. When the control device 2 receives incoming data for a mobile station MS in the idle mode, it transmits an incoming notification (paging announce) to a plurality of wireless base stations BS within the paging group PG to which the mobile station MS belongs.

After having received this incoming notification, the wireless base stations BS advertises (broadcast or multicast) an incoming notification message 100 (paging message: MOB_PAG-ADV).

When the mobile station MS confirms that the incoming notification message 100 is addressed to itself, it leaves the idle mode IM and switches to a normal mode NM. It then registers with a specific wireless base station BS and establishes a link with that specific wireless base station BS.

After establishing a link, the wireless base station BS performs call reception (or calling) to the relevant mobile station MS by transmitting a signal addressed to that mobile station to the corresponding mobile station MS.

FIG. 2 is a drawing depicting an idle mode transition procedure of the prior art. A mobile station MS desired transition to the idle mode IM transmits an idle mode transition request message in the form of a (DREG-REQ: De-REgistration REQuest) to a wireless base station BS (Step S1). At this time, the mobile station MS includes a paging cycle request in the idle mode transition request message DREG-REQ.

The paging cycle request is a request for a paging cycle (PC) desired by the mobile station MS, or in other words, an intermittent reception cycle desired by the mobile station MS.

Although a short paging cycle PC makes it possible to shorten the response delay of the mobile station MS to an incoming signal, this also results in frame targeted for monitoring of incoming notifications occurring more frequently, thereby increasing the power consumption of the mobile station MS.

Conversely, although a long paging cycle PC results in a longer response delay, since frames targeted for monitoring of incoming notifications do not occur that frequently, power consumption of the mobile station MS decreases.

The mobile station MS determines its own paging cycle request in consideration of a tradeoff between response delay and power consumption.

A wireless base station BS that has received an idle mode transition request message (DREG-REQ) transmits that it has received the idle mode transition request to the control device 2 using an idle mode transition request reception confirmation message in the form of an (IM_Entry_State_Change_Req) (Step S2).

At this time, the wireless base station BS includes a mobile station identifier (MSID), a wireless base station identifier (BSID) and a paging cycle request in the idle mode transition request reception confirmation message (IM_Entry_State_Change_Req).

When the idle mode transition request reception confirmation message (IM_Entry_State_Change_Req) is received by the control device 2, the control device 2 determines the paging cycle PC, paging offset Poff, paging interval length (PL) and paging group PG of the mobile station MS after considering the paging cycle request, and then retains the paging cycle PC, paging offset Poff, paging interval length PL and paging group PG of the mobile station MS.

The paging offset Poff indicates the location in the paging cycle PC where the frame targeted for monitoring of incoming notification starts.

Although to subsequently explained again in detail, the paging interval length PL is a period within the paging cycle PC from the start to the end of the frame targeted for monitoring of incoming notification.

With the exception of cases in which the paging cycle of the paging cycle request is extremely large or extremely small, for example, the control device 2 basically uses the same value as the paging cycle request for the determined paging cycle PC.

The control device 2 then transmits an idle mode transition request reception response message (IM_Entry_State_Change_Rsp) to the wireless base station BS that further includes the mobile station identifier (MSID), base station identifier (BSID), paging cycle PC, paging offset Poff, paging interval length PL and paging group PG (Step S3).

When the idle mode transition request reception response message (IM_Entry_State_Change_Rsp) is received, the wireless base station BS transmits an idle mode transition command message in the form of (DREG-CMD: De-REgistration CoMmanD) to the mobile station MS (Step S4).

At this time, the wireless base station BS includes the paging cycle PC, paging offset Poff, paging interval length PL and paging group PG in the idle mode transition command message (DREG-CMD).

Subsequently, the mobile station MS switches from the normal mode NM to the idle mode IM in which it intermittently monitors frames targeted for incoming notification monitoring defined by the received paging cycle PC, paging offset Poff and paging interval length PL.

Furthermore, although the paging interval length PL of the mobile station MS is determined by the control device 2 in FIG. 2, it may also be determined by a wireless base station BS. In the case of using a paging interval length uniquely given in the system instead of determining paging interval length PL for each mobile station, instead of the control device 2 transmitting a paging interval length PL determined for each mobile station to the wireless base stations BS, the wireless base stations BS may transmit the given paging interval length PL to a mobile station MS.

Although the specifications for determining paging interval length PL of mobile stations MS as described above are not particularly limited to any of the forms in IEEE standard 802.16e, current specifications of the WIMAX Forum NWG (Network Working Group) specify determination by the wireless base stations BS.

A mobile station MS carries out an idle operation at a paging cycle PC determined on the basis of a desired paging cycle request according to the idle mode transition procedure as described above.

On the other hand, the control device 2 retains the paging group PG, paging cycle PC, paging offset Poff, and depending on the implementation method, paging interval length PL of the mobile station MS.

Paging cycle PC, paging offset Poff and paging interval length PL are defined in frame units according to IEEE standard 802.16e, and frames targeted for incoming notification monitoring are defined as depicted in FIG. 3 in accordance with the following equation using these parameters.

$$N_{frame} \text{ modulo paging cycle PC} = \text{paging offset Poff}$$

Here, "modulo" is a remainder operator.

$N_{frame}$ is the frame number of the starting frame of those frames targeted for incoming notification monitoring (112 and 122 in the example depicted in FIG. 3). Those frames present over the paging interval length PL starting from this starting frame are targeted for incoming notification monitoring.

An incoming notification monitoring period I is generated for each number of frames of a paging cycle (10 frames in FIG. 3). When the wireless base stations BS broadcast an incoming notification message 100, it broadcasts the message 100 with any of the frames targeted for incoming notification monitoring. Frame length is defined on the basis of time in milliseconds, for example.

Moreover, paging offset Poff is controlled so as to be able to be changed. This is to disallow incoming notification messages to a mobile station MS to concentrate in a specific frame. In the example of FIG. 3, in the case of setting the paging cycle PC to 10 frames and generating an incoming notification monitoring period I for each number of frames of the paging cycle PC, a paging offset Poff equal to two frames is imparted, the incoming notification monitoring period I starts from the 112th frame, and the paging interval length PL is 2 frames.

A rest period RC is present after the incoming notification monitoring period I.

In IEEE standard 802.16e, a mobile station MS in the idle mode IM may receive a paging cycle PC, paging offset Poff and paging interval length PL simultaneous to being notified of a new paging group PG by the control device 2 by location registration updating processing.

This is to notify the mobile station MS of changed values in the case the control device 2 desires to change the paging cycle PC, paging offset Poff and paging interval length PL according to a paging group PG.

The control device 2 subsequently retains the changed paging cycle PC, paging offset Poff and paging interval length PL.

In addition, there are also technologies of the prior art for changing the paging group PG (also referred to as paging area, location area or location registration area), or changing the paging cycle PC according to differences in time periods (such as day or night) or differences in services subscribed to by the mobile station MS (see, for example, Patent Documents 1 to 3).

Patent Document 1: Japanese Laid-open Patent Publication No. 2004-247801
Patent Document 2: Japanese Laid-open Patent Publication Laid-open No. 2005-79660
Patent Document 3: Japanese Laid-open Patent Publication No. H6-141365

DISCLOSURE OF THE INVENTION

Problems to be Solved by the Invention

According to the prior art as described above, when a mobile station MS in the idle mode IM moves to a wireless base station BS having a different frame length or the frame length of a wireless base station BS is changed, an incoming notification monitoring operation is carried out at a paging cycle PC (T2) that differs from the paging cycle PC (T1) desired by the mobile station MS. In such a case, a problem results in which energy consumption in the mobile station MS ends up increasing, or response delay during reception ends up increasing.

Thus, an object of the present invention to provide a mobile station and a wireless base station side device in a wireless communication system that make it possible to reduce fluctuations in power consumption of a mobile station MS and fluctuations in response delay to an incoming notification, even if frame length changes for each wireless base station, in a wireless communication system in which paging cycles PC are defined in frame length units.

Means for Solving the Problem

A first aspect of the present invention that solves the above-mentioned problems is a mobile station that detects an incoming notification by receiving a signal from a wireless base station for each cycle defined by a number of frames, the mobile station including: a measurement unit to detect a change in frame length of a reception frame; a cycle changing unit to change the cycle for monitoring the incoming notification by increasing or decreasing the number of frames that defines the cycle in a case of having detected the change; and an incoming notification monitoring unit to carryout reception of a signal from the wireless base station in accordance with the cycle changed by the cycle changing unit.

A second aspect of the present invention that solves the above-mentioned problems is a mobile station that detects an incoming notification by receiving a signal from a wireless base station for each cycle defined by a number of frames, the mobile station including: a measurement unit to detect a change in frame length of a reception frame; a changing unit to increase or decrease a reception interval for monitoring the incoming notification in accordance with the cycle in a case of having detected the change; and an incoming notification monitoring unit to carry out reception of a signal from the wireless base station in accordance with the interval changed by the changing unit.

Moreover, a second aspect of the present invention that solves the above-mentioned problems is a wireless base station side device having a frame length that differs from a frame length registered by a mobile station for which an intermittent reception cycle has been set, in a wireless communication system that carries out incoming notification for the mobile station using any of a group of reception frames intermittently received by the mobile station, and sets the intermittent reception cycle in frame length units. The wireless base station side device has a retention unit which retains a frame length registered by the mobile station, a cycle changing unit which changes an intermittent reception cycle set in frame length units of the wireless base station so as to be equal to an intermittent reception cycle set with the frame length registered by the mobile station in time units; and an incoming notification unit which carries out incoming notification for the mobile station at the intermittent reception cycle set with the frame length of the wireless base station.

According to the characteristics of the present invention described above, in a system in which a reception (paging) cycle is defined in frame length units, fluctuations in power consumption and fluctuations in response delay to an incoming notification of a mobile station MS can be inhibited by changing the paging cycle even if the frame length has changed.

BRIEF DESCRIPTION OF THE DRAWINGS

FIG. 4 is a drawing depicting an example of frames targeted for incoming notification monitoring of a mobile station MS;

FIG. 5 is a drawing depicting an example of frames targeted for incoming notification monitoring of a mobile station MS according to the present invention;

FIG. 6 is a block diagram of a first embodiment of a communication system in accordance with the present invention;

FIG. 10 is a drawing depicting a paging information table in an embodiment of the present invention;

FIG. 12 is a drawing depicting a paging information table in a second embodiment of the present invention;

DESCRIPTION OF EMBODIMENTS

Figure 1:
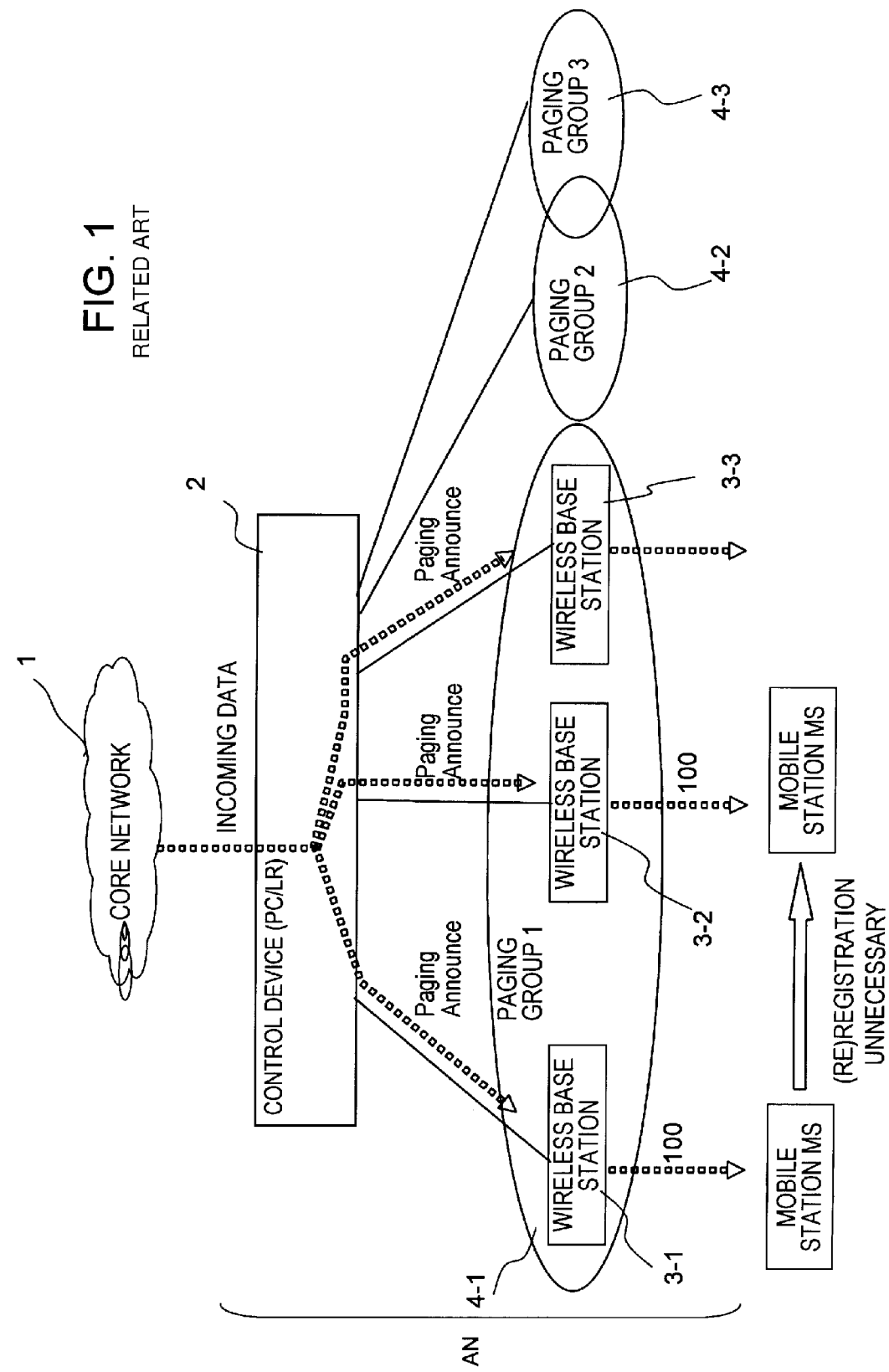
FIG. 1 is a drawing depicting a network configuration of the prior art.

The following provides an explanation of configurations of embodiments of the present invention.

FIG. 4 is a drawing depicting frames targeted for incoming notification monitoring in a mobile station MS. This drawing depicts the relationship between frame length and frames targeted for incoming notification monitoring in the case a mobile station MS, which has switched to an idle mode IM in a wireless area of a wireless base station BS3-1, has moved to a wireless base station BS3-2 and then wireless base station BS3-3 in that order in particular.

The frame length of the wireless base station BS3-1 is 5 milliseconds, the frame length of the wireless base station BS3-2 is 10 milliseconds, and the frame length of the wireless base station BS3-3 is 2.5 milliseconds. When the mobile station MS is under the control of the wireless base station BS3-1 (FIG. 4(A)), the mobile station MS switches to the idle mode IM and at that time, a paging cycle PC is 10 (frames), a paging offset Poff is 2 (frames), and a paging interval length PL is 2 (frames).

When the mobile station MS moves to the wireless base station BS3-2 (FIG. 4(B)), since the frame length of the wireless base station BS3-2 (10 milliseconds) is longer than that of the wireless base station BS3-1, the paging cycle PC becomes longer in terms of time units.

Thus, the response delay to reception becomes greater than a value desired by the mobile station MS during idle mode transition.

In contrast, when the mobile station MS moves to the wireless base station BS3-3, since the frame length of the wireless base station BS3-3 is shorter than that of the wireless base station BS3-1, the paging cycle PC becomes shorter in terms of time units. As a result, since the frequency at which incoming notification monitoring periods occur increases, power consumption of the mobile station MS becomes greater than a value desired by the mobile station MS during idle mode transition.

Furthermore, although FIG. 4 illustrates the case in which the mobile station MS has moved to the wireless base station BS3-2 or the wireless base station BS3-3 having different frame lengths, the same problem occurs even if an administrator has changed the frame length of the wireless base station BS3-1, for example.

IEEE standard 802.16e does not take into consideration an environment in which wireless base stations BS are present having different frame lengths, and methods for dealing with the problems described have yet to be indicated.

However, in the case the frame length of a wireless base station BS based on next-generation IEEE standard 802.16 differs from the frame length of a wireless base station BS based on IEEE standard 802.16e, an environment can be easily imagined in which wireless base stations having a different frame length are both present due to the presence of wireless base stations BS based on IEEE standard 802.16e and wireless base stations BS based on next-generation IEEE standard 802.16.

Therefore, in this embodiment, in the case a mobile station MS in the idle mode IM has moved into a wireless area of a wireless base station BS having a different frame length, or in the case the frame length of a wireless base station BS has changed, the mobile station MS changes the paging cycle PC, while in the case a wireless base station BS having a different frame length broadcasts an incoming notification, the wireless base station BS broadcasts the incoming notification at the paging cycle PC changed by the control device 2 or the wireless base station BS.

As a result, power consumption and response delay to reception of the mobile station MS are maintained.

Namely, as depicted in FIG. 5 relative to FIG. 4, in the case the mobile station MS has moved from the wireless base station BS3-1 to the wireless base station BS3-2 having a longer frame length (FIG. 5(B)), the number of frames of the paging cycle PC becomes smaller, while conversely, in the case the mobile station MS has moved to the wireless base station BS3-3 having a shorter frame length (FIG. 5(C)), the number of frames of the paging cycle PC becomes larger.

Preferably, both power consumption and response delay to reception of the mobile station MS can be maintained by making the paging cycles PC equal in terms of time units.

In FIG. 5, the paging interval length PL is changed by changing the number of frames. However, although it is desirable to change the paging interval length PL from the viewpoint of maintaining power consumption and response delay, since the effect of maintaining power consumption and response delay is obtained even by changing the paging cycle PC only, the paging interval length PL is not required to be changed in this case.

In the case the mobile station MS in the idle mode has moved to a wireless base station BS having a different frame length, or in the case the frame length of a wireless base station BS has changed, since there is no change from the perspective of the mobile station MS that there has been a change in the frame length in either case, this situation is hereinafter collectively referred to as a change in frame length.

FIG. 6 is a block diagram of a first embodiment of the device configuration of a communication system as described above.

This communication system has a wireless base station BS, a mobile station MS and a control device 2. Furthermore, in FIG. 6, the control device 2 is depicted as an independent device from the mobile station MS and the wireless base station BS. However, as previously explained with respect to FIG. 1, the positioning of the control device 2 is not limited to this configuration so as to be understood within the concept of being a wireless base station side device. Thus, a configuration may be employed in which the control device 2 is provided within a wireless base station as a portion of any of the functions of the wireless base station BS. This applies similarly to the configurations of other embodiments subsequently described.

In FIG. 6, a frame length measurement unit 40 of the mobile station MS measures frame length based on a frame signal sent from the wireless base station BS as previously explained. Namely, in the case of IEEE standard 802.16e, the frame length is acquired from a frame length code value (Frame Duration Code) contained in the field of a DL-MAP message sent by a downlink, namely a wireless link directed from the wireless base station BS towards the mobile station MS. Alternatively, frame length is acquired by measuring the interval between frame preambles.

In the case the mobile station MS has moved to a wireless base station BS having a different frame length, or in the case the frame length of a wireless base station BS has changed, frame length changes as a result thereof. The frame length measurement unit 40 assesses this state and transmits the measured frame length after it has changed to a paging cycle changing unit 41.

The paging cycle changing unit 41 changes the paging cycle as explained in FIG. 5. Namely, in the case the mobile station MS has moved to a wireless base station having a longer frame length, the number of frames of the paging cycle PC becomes smaller, while conversely, in the case the mobile station MS has moved to a wireless base station having a shorter frame length, the number of frames of the paging cycle PC becomes larger. Preferably, the paging cycle PC changes so as to be equal to the paging cycle PC prior to the change in frame length in terms of time units. The changed paging cycle PC, paging offset Poff and paging interval length PL are then transmitted to an incoming notification monitoring unit 42.

The incoming notification monitoring unit 42 receives an incoming notification message 100 from the wireless base station BS by monitoring (receiving) frames targeted for incoming notification monitoring defined by paging cycle PC, paging offset Poff and paging interval length PL.

On the other hand, when the control device 2 receives incoming data DT addressed to the mobile station MS, a paging information retention unit 20 transmits the frame length, paging cycle PC, paging offset Poff and paging interval length PL of that mobile station MS retained during idle mode transition or updating of location registration to the paging cycle changing unit 21.

The paging cycle changing unit 21 then acquires frame length (from a frame length retention unit 22) for each of a plurality of wireless base stations within the paging group PG, and changes the paging cycle PC for each wireless base station using the same method as the paging cycle changing unit 41 of the mobile station MS so that the paging cycles PC are equal in terms of time units.

Next, the paging cycle changing unit 21 transmits the changed paging cycle PC, paging offset Poff and paging interval length PL determined for each wireless base station BS to an incoming notification unit 30 of each wireless base station BS within the paging group PG.

Additionally, the paging information retention unit 20 may output the frame length, paging cycle PC, paging offset Poff or paging interval length PL during idle mode transition or location registration updating.

In the case of outputting values during idle mode transition, it is ultimately necessary to retain both values during idle mode transition and location registration updating.

Regardless of whether the values are those during idle mode transition or location registration updating, the mobile station MS has the frame length registered in the control device 2.

The wireless base station BS then broadcasts the incoming notification message 100 with any of the frames targeted for incoming notification monitoring defined by the paging cycle PC, paging offset Poff and paging interval length PL received by the incoming notification unit 30.

Furthermore, although the paging cycle changing unit 21 is present in the control device 2 in FIG. 6, it may also be provided in the wireless base station BS.

Figure 7:
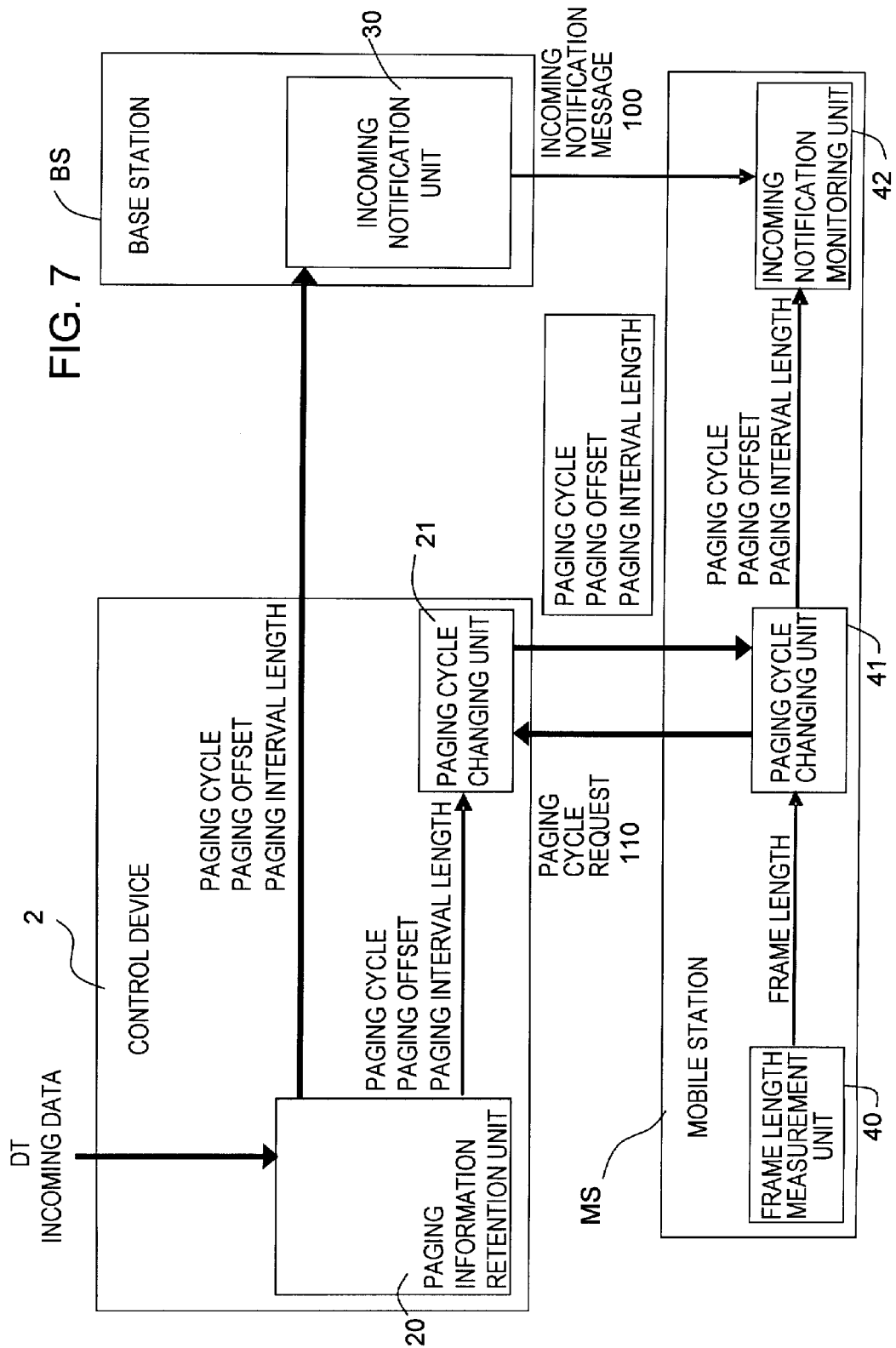
FIG. 7 is a block diagram of a second embodiment of a communication system in accordance with the present invention.

FIG. 7 is a block diagram of a second embodiment of the device configuration of a communication system.

The frame length measurement unit 40 of the mobile station MS measures frame length based on a frame signal transmitted from the wireless base station BS as previously explained in the first embodiment, and in the case it detects that frame length has changed, transmits the measured frame length to the paging cycle changing unit 41.

The paging cycle changing unit 41 of the mobile station MS requests that the paging cycle be changed by transmitting a paging cycle request 110 to the paging cycle changing unit 21 of the control device 2. Namely, the paging cycle changing unit 41 changes the paging cycle. More specifically, in the case the mobile station MS has moved to a wireless base station having a longer frame length, the number of frames of the paging cycle PC becomes smaller, while conversely, in the case the mobile station MS has moved to a wireless base station having a shorter frame length, the number of frames of the paging cycle PC becomes larger. Preferably, the paging cycle is requested to be changed so that the paging cycles PC are equal in terms of time units by transmitting the paging cycle request 110 to the paging cycle changing unit 21 of the control device 2.

Furthermore, although FIG. 7 is depicted such that messages are transmitted and received directly between the paging cycle changing unit 41 of the mobile station MS and the paging cycle changing unit 21 of the control device 2, in the case the control device 2 is independent from the wireless base station BS or in the case it is provided within the wireless base station BS as a part of the functions thereof, transmission and reception of messages between the mobile station MS and the control device 2 are carried out through the wireless base station BS.

This applies similarly to the embodiments indicated below.

The paging cycle changing unit 41 of the mobile station MS receives the paging cycle PC, paging offset Poff and paging interval length PL determined on the basis of the paging cycle request 110 from the paging cycle changing unit 21 of the control device 2 in response to the request to change the paging cycle, and then transmits those parameters to the incoming notification monitoring unit 42.

The incoming notification monitoring unit 42 monitors those frames targeted for incoming notification monitoring defined by the received paging cycle PC, paging offset Poff and paging interval length PL, and at the same time receives the incoming notification message 100 from the incoming notification unit 30 of the wireless base station BS.

When the paging cycle changing unit 21 of the control device 2 receives the paging cycle request 110 from the mobile station MS, it determines the paging cycle PC, paging offset Poff and paging interval length PL based on this received paging cycle request 110 and then transmits these parameters to the mobile station MS and the paging information retention unit 20.

The paging information retention unit 20 of the control device 2 then retains the received paging cycle PC, paging offset Poff and paging interval length PL for each mobile station.

When the control device 2 receives incoming data DT addressed to a mobile station MS, the paging information retention unit 20 transmits the paging cycle PC, paging offset Poff and paging interval length PL of that mobile station MS retained thereby to the incoming notification unit 30 of the wireless base station BS.

In the wireless base station 30, the incoming notification unit 30 broadcasts an incoming notification message 100 to any of the frames targeted for incoming notification monitoring defined by the received paging cycle PC, paging offset Poff and paging interval length PL.

With respect to the difference between the solutions employed by the configurations of the embodiments depicted in FIGS. 6 and 7, the solution depicted in FIG. 7 offers the advantage of not requiring the frame length during idle mode transition or location registration updating, or the frame length of each wireless base station, to be retained by the control device 2.

Figure 8:
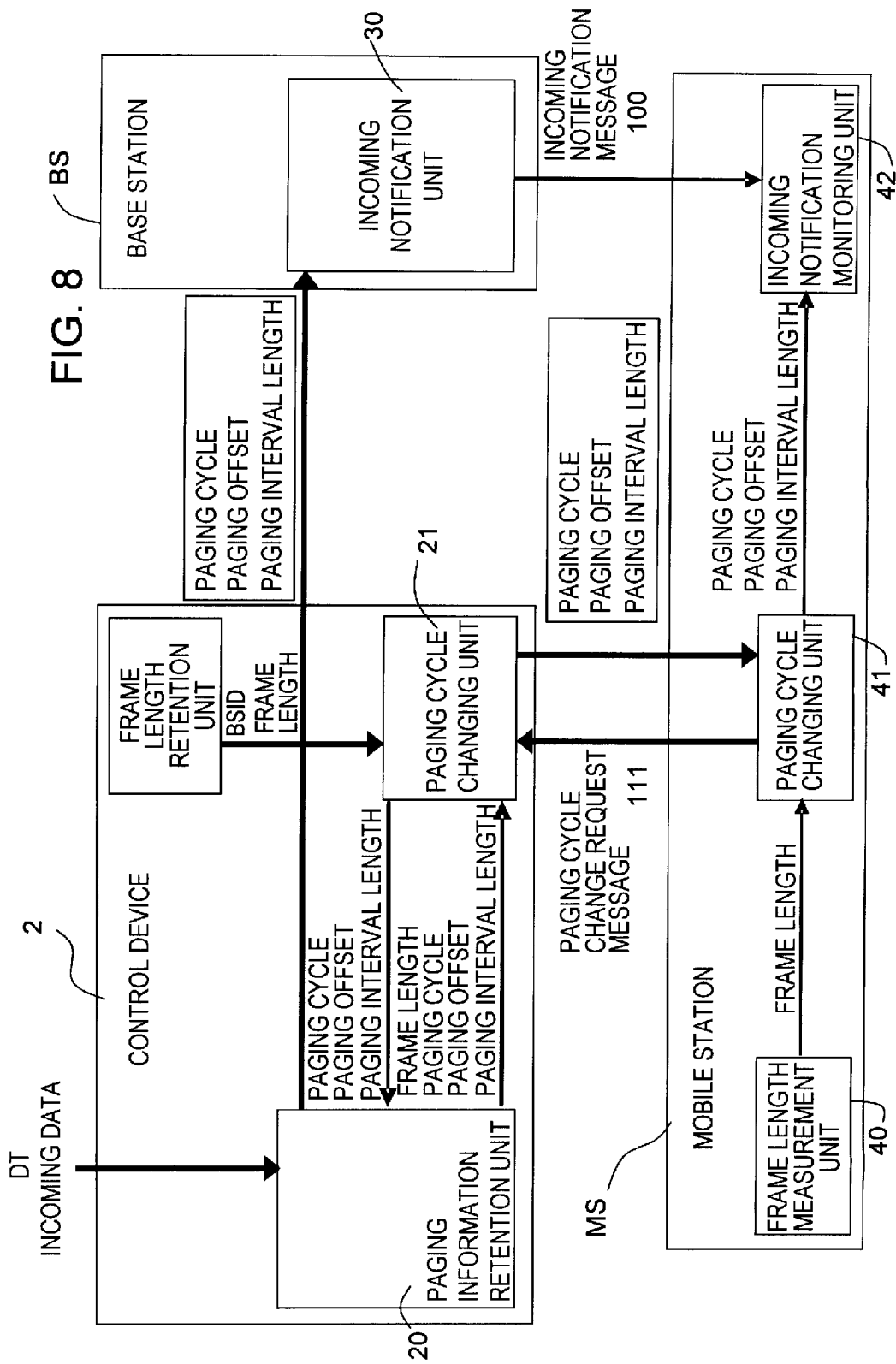
FIG. 8 is a block diagram of a third embodiment of a communication system in accordance with the present invention.

FIG. 8 is a block diagram of the configuration of a third embodiment of a different device of a communication system.

In FIG. 8, the frame length measurement unit 40 of the mobile station MS measures the frame length of the wireless base station BS, and in the case the frame length has changed, transmits this frame length to the paging cycle changing unit 41 in the same manner as the previous configuration example.

The paging cycle changing unit 41 of the mobile station MS transmits a paging cycle change request message 111 to the control device 2 to request that the paging cycle PC be changed.

At this time, the mobile station MS does not transmit the paging cycle request 110, but only transmits the paging cycle change request message 111 not including the paging cycle. In response to this paging cycle change request message 111, the paging cycle changing unit 41 of the mobile station MS receives the paging cycle PC, paging offset Poff and paging interval length PL from the paging cycle changing unit 21 of the control device 2.

Next, the parameters received with the paging cycle changing unit 41 are transmitted to the incoming notification monitoring unit 42. The incoming notification monitoring unit 42 monitors frames targeted to incoming notification monitoring defined by the received paging cycle PC, paging offset Poff and paging interval length PL, and receives the incoming notification message 100 from the wireless base station BS.

When the paging cycle changing unit 21 receives the paging cycle change request message 111 that does not contain the paging cycle request 110, the control device 2 acquires the frame length, paging cycle PC, paging offset Poff and paging interval length PL of that mobile station MS retained during idle mode transition or location registration updating from the paging information retention unit 20.

The paging cycle changing unit 21 acquires the frame length of the wireless base station BS to which that mobile station MS is currently connected from the frame length retention unit 22, and in the case the mobile station MS has moved to a wireless base station having a longer frame length, decreases the number of frames of the paging cycle PC, or conversely in the case the mobile station MS has moved to a wireless base station having a shorter frame length, increases the number of frames of the paging cycle PC. Preferably, the paging cycle is changed so that the paging cycles are equal in terms of time units. The changed paging cycle PC, paging offset Poff and paging interval length PL are then transmitted to the paging information retention unit 20 and the paging cycle changing unit 41 of that mobile station MS.

The paging information retention unit 20 retains the changed paging cycle PC, paging offset Poff and paging interval length PL. When the control device 2 has received incoming data DT addressed to a mobile station, the control device 2 transmits the paging cycle PC, paging offset Poff and paging interval length PL of the mobile station MS retained by the paging information retention unit 20 to the incoming notification unit 30 of the wireless base station BS.

The wireless base station BS then broadcasts the incoming notification message 100 with any of the frames targeted for incoming notification monitoring defined by the paging cycle PC, paging offset Poff and paging interval length PL received by the incoming notification unit 30.

In the embodiment of FIG. 8, the mobile station MS does not transmit the paging cycle request 110 when requesting a change in the paging cycle. The use of specifications in which the paging cycle request 110 is not transmitted when requesting a change in the paging cycle offers the advantage of eliminating the need to change the standard message specifications of IEEE 802.16e.

Next, an explanation is provided of a specific procedure of an embodiment for changing the paging cycle PC for each wireless base station in the case the mobile station MS has detected that the frame length of the wireless base station BS to which it is connected has changed or when its own paging cycle has changed in the device configuration of the communication system explained above.

Figure 9:
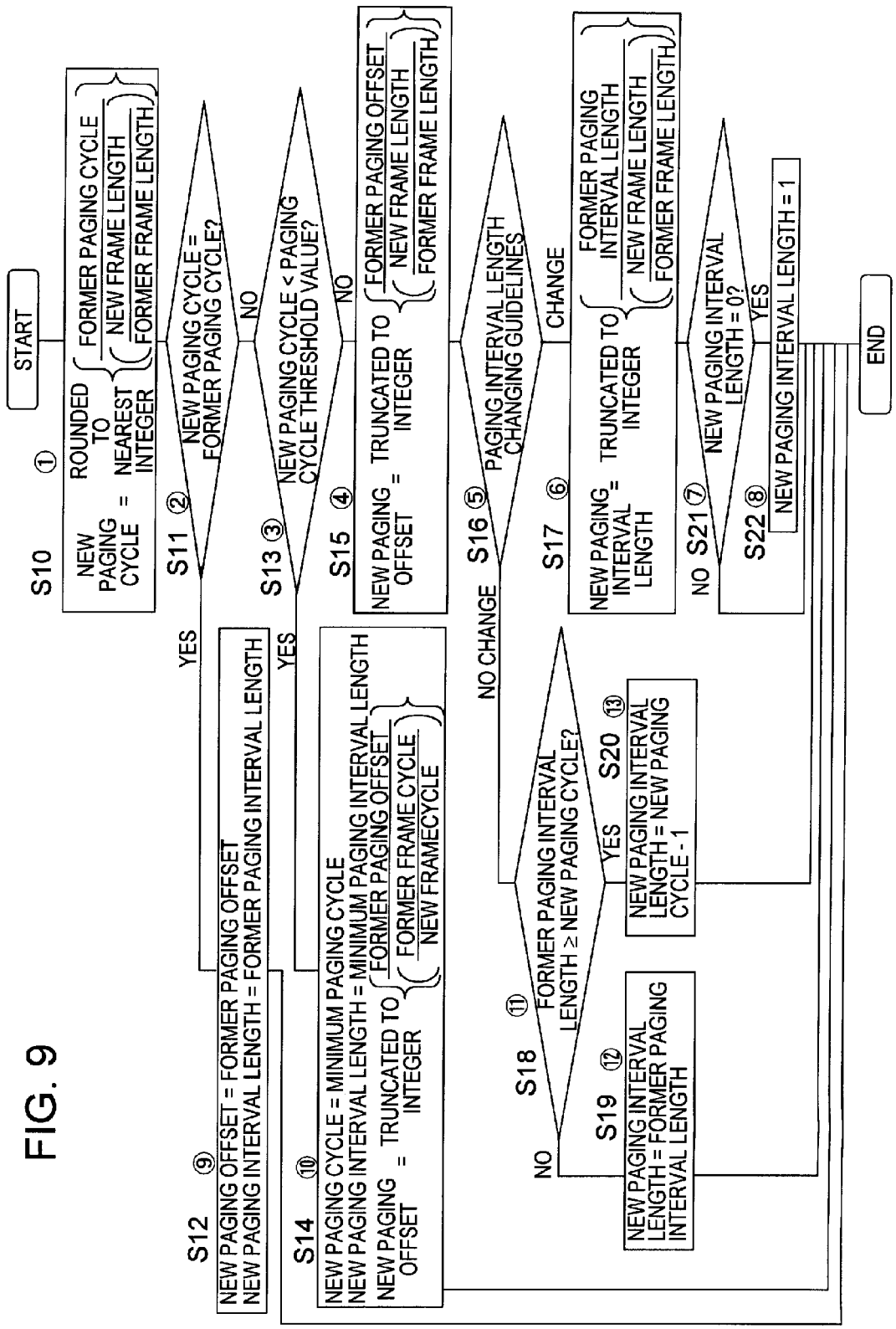
FIG. 9 is a drawing depicting the flowchart of a paging cycle changing procedure in an embodiment of the present invention.

FIG. 9 is a drawing depicting the flowchart of the paging cycle changing procedure of this embodiment.

The paging cycle changing unit 41 of the mobile station MS and the paging cycle changing unit 21 of the control device 2 change the paging cycle PC, paging offset Poff and paging internal length PL in accordance with this procedure.

Furthermore, the paging cycle changing units 21 (41) may also be provided in the wireless base station BS.

In FIG. 9, the former frame length is the frame length during idle mode transition or location registration updating, and in the case of the mobile station MS, is retained by the paging cycle changing unit 41. In addition, the former frame length is retained by the paging information retention unit 20 and transmitted to the paging cycle changing unit 21 in the case of the control device 2.

The new frame length in FIG. 9 is measured by the frame length measurement unit 40 in the case of the mobile station MS, and is the new frame length transmitted to the paging cycle changing unit 41. In the case of the control device 2, the new frame length is the frame length retained for each wireless base station by the frame length retention unit 22.

The frame length measurement unit 40 and the frame length retention unit 22 respectively transmit the new frame length to the paging cycle changing units 41 and 21.

The frame length of the wireless station BS in the frame length retention unit 22 is a given value or is acquired by the control device 2 making in inquiry to the wireless base station BS.

On the other hand, the frame length measurement unit 40 of the mobile station MS either acquires the frame length from a frame length code value (Frame Duration Code) contained in the DL-MAP message field of each frame in the case of IEEE standard 802.16e, or acquires the frame length by measuring the frame interval between each frame.

The former paging cycle, former paging offset Poff and former paging interval length in FIG. 9 are the respective values during idle mode transition or location registration updating, and in the case of the mobile station MS, are retained by the paging cycle changing unit 41.

In addition, in the case of the control device 2, the former paging cycle, former paging offset Poff and former paging interval length are retained by the paging information retention unit 20 and transmitted to the paging cycle changing unit 21.

The new paging cycle PC, new paging offset Poff and new paging interval length PL in FIG. 9 are the paging cycle PC, paging offset Poff and paging interval length PL changed by the paging cycle changing units 41 and 21 of the mobile station MS and the control device 2.

Since the paging cycle changing units 41 and 21 of the mobile station MS and the control device 2 change these parameters using the same method as depicted in FIG. 9, the mobile station MS has the same paging cycle PC, paging offset Poff and paging interval length PL as the wireless base station BS to which it is connected.

The following provides an additional explanation of the procedure for changing paging cycle of FIG. 9.

Basically, a scale factor of the new frame length relative to the former frame length is determined, and the new paging cycle, new paging offset and new paging interval length are determined from the former paging cycle, former paging offset and former paging interval length corresponding to this scale factor (Steps S10, S15 and S17).

Since the paging cycle PC is defined by a integer in the form of the number of frames, the new paging cycle and the former paging cycle may be the same depending on the above-mentioned scale factor (YES in Step S11).

Processing carried out in response to such cases is the processing of Step S12. Namely, the new paging offset Poff and the new paging interval length are respectively set to their former values (Step S12).

In addition, the new paging cycle may become an extremely small value, such as a value that is so small that it prevents a cyclical incoming notification period from being defined, depending on the above-mentioned scale factor (YES in Step S13). Processing carried out in response to such cases is the processing of Step S14.

Namely, in Step S14, the new paging cycle and new paging interval length are respectively set to allowable minimum values of the system. Moreover, the new paging offset Poff is determined corresponding to the scale factor between the new and former paging cycles (Step S14).

A paging cycle threshold value, minimum paging cycle and minimum paging interval length are designated as unique system settings, and are shared by the control device 2 and the mobile station MS having the paging cycle changing units 21 and 41.

The system employs guidelines for changing or not changing paging interval length (Step S16). The paging interval length is not necessarily required to be changed according to a change in the paging cycle. For example, in the case the frame length has increased and the paging cycle has been decreased in units of the number of frames, response delay to reception can be maintained without having to further decrease the paging interval length.

In this case, although power consumption tends to increase since paging interval length increases in terms of time units, in the case the paging interval length is already adequately small in units of the number of frames, system guidelines may allow such an increase in the paging interval length. System guidelines for changing paging interval length are in the form of unique system settings, and are shared by the control device 2 and the mobile station MS having the paging cycle changing units 21 and 41.

In addition, in the case, for example, the frame length has become shorter and the paging cycle has increased in units of the number of frames, since the frequency at which incoming notification monitoring periods are generated is the same before and after a change in frame length even if the paging interval length is increased further, power consumption of the mobile station MS can be maintained.

In the case the paging interval length changing guidelines of the system determined by this assessment are such that the paging interval is not changed (No Change in Step S16), the former paging interval length is used for the new paging interval length with the exception of cases in which the former paging interval length is equal to or greater than the new paging cycle and an incoming notification monitoring period cannot be defined (Steps S18 and S19).

In the case the paging interval length is equal to or greater than the new paging cycle (YES in Step S18), the new paging interval length is made to be one frame less than the new paging cycle (Step S20).

On the other hand, in the case of guidelines in which the paging interval length are such that the paging interval length is changed (Change in Step S16), there is the possibility of the new paging interval length being "0" depending the scale factor of the new frame length relative to the former frame length (YES in Step S21). In such a case, the new paging interval length is set to "1" (Step S22).

FIG. 10 is a paging information table in an embodiment of the present invention. This paging information table is retained by the paging information retention unit 20 of the control device 2. The paging information table is composed of a paging cycle A [frames], a paging offset Poff B [frames], a paging interval length C [frames] and a frame length D [ms] for each mobile station indicated with a mobile station identifier ID during idle mode transition or location registration updating.

Moreover, in the case of retaining values during both idle mode transition and location registration updating as previously described, the paging information table is divided into two tables.

As a result of employing the composition described above, even if frame length changes in a system in which paging cycle is defined in frame length units, power consumption and response delay to reception of the mobile station MS can be maintained by changing the paging cycle according to the present invention.

Moreover, as was indicated in FIG. 7 depicting the second embodiment, in the case the mobile station MS has detected that the frame length of the wireless base station BS to which it is connected has changed with the frame length measurement unit 40, the paging cycle request 110 is transmitted from the mobile station MS to the paging cycle changing unit 21 of the control device 2 so that the paging cycles are equal in terms of time units. The changed paging cycle is then received from the paging cycle changing unit 21 after which the incoming notification monitoring operation is carried out based on the received paging cycle.

On the other hand, once the control device 2 has received the paging cycle request 110, it changes the paging cycle based on the paging cycle request and transmits the changed paging cycle to the mobile station MS. At the same time, the changed paging cycle is retained in the paging information retention unit 20, and in the case incoming data DT has been received, incoming notification including the retained paging cycle is transmitted to the wireless base station BS.

The present embodiment differs from the configuration of the first embodiment in that simultaneous to the mobile station MS detecting a change in the frame length of the wireless base station BS to which it is connected, the paging cycle of the control device 2 is changed and the result of that change is transmitted and received between the mobile station MS and the control device 2.

Figure 11:
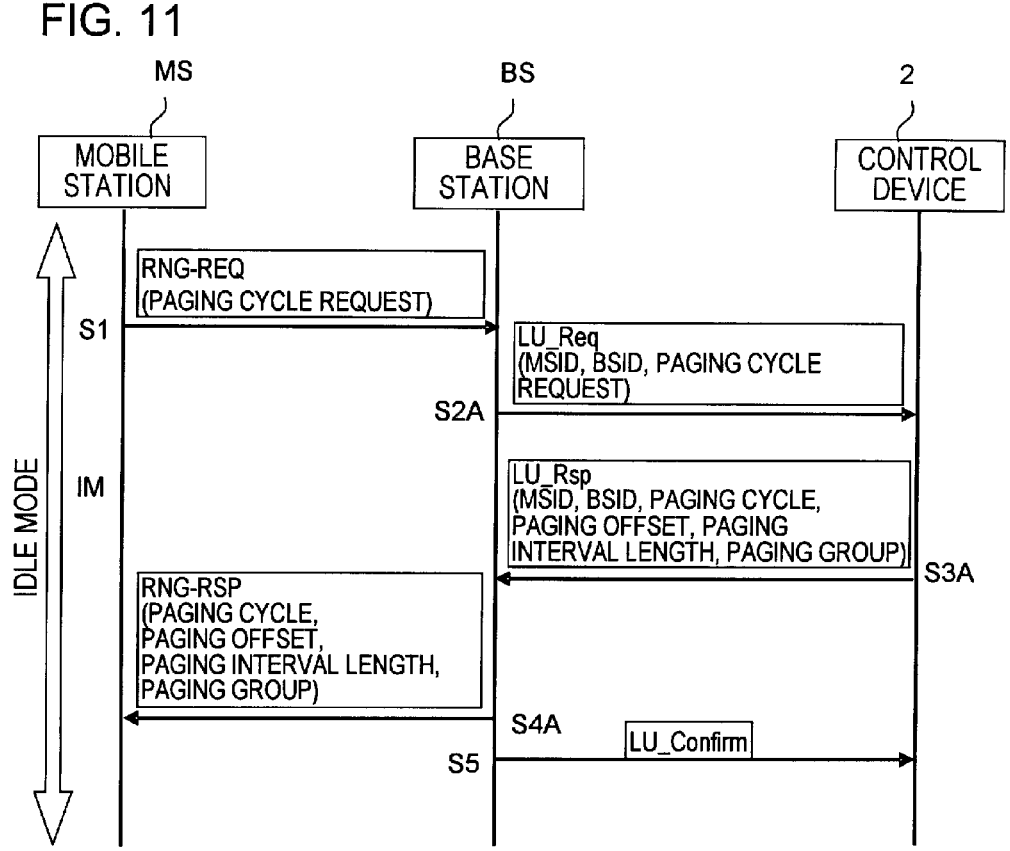
FIG. 11 is a drawing depicting the flow of a paging cycle changing request procedure in a second embodiment of the present invention.

FIG. 11 depicts the flow of a paging cycle changing request procedure in the second embodiment.

Messages are transmitted and received between the paging cycle changing unit 41 of the mobile station MS and the paging cycle changing unit 21 of the control device 2.

In FIG. 11, when the mobile station MS has detected that the frame length has changed, it transmits a paging cycle request so that the paging cycles become equal in terms of time units in the same manner as during transition to the idle mode (Step S1). The procedure for making the paging cycles equal in terms of time units is similar to the portion of the paging cycle changing procedure of the first embodiment (see FIG. 9) that determines the new paging cycle.

Furthermore, a paging cycle request is inherently determined corresponding to the new power consumption and response delay requirements when the requirements of the power consumption and response delay of the mobile station MS have changed. A ranging message (RNG-REQ) in compliance with IEEE standard 802.16e is also used to transmit the paging cycle request (Step S1).

The paging cycle request and the response thereto are carried out with a ranging message (RNG-REQ, RNG-RSP) that carries out wireless ranging between the mobile station MS and the wireless base station BS.

Here, the paging cycle request (RNG-REQ) is equivalent to a paging cycle change request message. Since it is always necessary to transmit a ranging message (RNG-REQ) in order for the mobile station MS to establish a link with the wireless base station BS in compliance with IEEE standard 802.16e, the notification of the paging cycle request is possible by adding the paging cycle request to this message.

Since a paging cycle request cannot be added to ranging messages (RNG-REQ) in the case of the current IEEE standard 802.16e, specifications of the ranging message (RNG-REQ) are changed to enable the addition thereof.

Next, the paging cycle request is transmitted by the wireless base station BS to the control device 2 (Step S2A). An LU_Req message based on WIMAX Forum NWG (Network Working Group) specifications, for example, can also be used for this transmission (Step S2A). Here, the LU_Req message is equivalent to a paging cycle change request notification message.

Next, the control device 2 determines the paging cycle PC, paging offset Poff and paging interval length PL of the mobile station MS in the same manner as that during transition of the mobile station MS to the idle mode IM, and then transmits those parameters to the wireless base station BS (Step S3A).

In addition, with respect to the paging group PG, in the case the mobile station MS has moved and the paging group has changed, the control device 2 transmits the changed paging group, or transmits the same paging group as the previous paging group in the case the paging group has not changed, to the wireless base station BS.

An LU_Rsp message in accordance with WIMAX Forum NWG (Network Working Group) specifications, for example, is also used for transmission from the control device 2 to the wireless base station BS in Step S3A of FIG. 11. The LU_Rsp message here is equivalent to a paging cycle change request response message.

Next, the wireless base station BS transmits the paging cycle, paging offset, paging interval length and paging group to the mobile station MS (Step S4A). An (RNG-RSP) corresponding to the (RNG-REQ) is also used for this transmission. The (RNG-RSP) here is equivalent to a paging cycle response message.

Next, the wireless base station BS that has transmitted the paging cycle response message transmits a paging cycle change confirmation message to the control device 2 (Step S5). An LU_Confirm message in accordance with WIMAX Forum NWG (Network Working Group) specifications, for example, is also used for the paging cycle change confirmation message.

Furthermore, the paging interval length may also be determined by the wireless base station BS instead of the control device 2 in accordance with a value uniquely set in the system in the same manner as the prior art. In this case, the (LU_Rsp) equivalent to a paging cycle change request response message does not contain the paging interval length.

FIG. 12 depicts a paging information table in the second embodiment. This paging information table is retained by the paging information retention unit 20. The paging information table of the present embodiment differs from that of the first embodiment in that it does not require retention of frame length. This is because, since a change in the paging cycle in consideration of a change in frame length is conveyed to the control device 2 in the form of a paging cycle request by the paging cycle changing unit 41 of the mobile station MS, the control device 2 does not require information relating to frame length required to make that change.

In the case the paging interval length is determined by the wireless base station BS as described above, the paging information table is not required to retain a paging interval length for each mobile station.

As a result of employing the configuration of the second embodiment as described above, power consumption and response delay to reception of the mobile station MS can be maintained by changing the paging cycle even if the frame length has been changed in a system in which paging cycle is defined in frame length units.

Next, in the third embodiment as depicted in FIG. 8, in the case the mobile station MS has detected a change in the frame length of the wireless base station BS to which it connects, the mobile station MS transmits a paging cycle change request to the control device 2, and the control device 2 responds to the mobile station MS with a paging cycle so that the paging cycles are equal in terms of time units.

This third embodiment differs from the second embodiment in that the paging cycle change request message does not contain a paging cycle request. As a result, IEEE standard 802.16e message specifications are not required to be changed.

Figure 13:
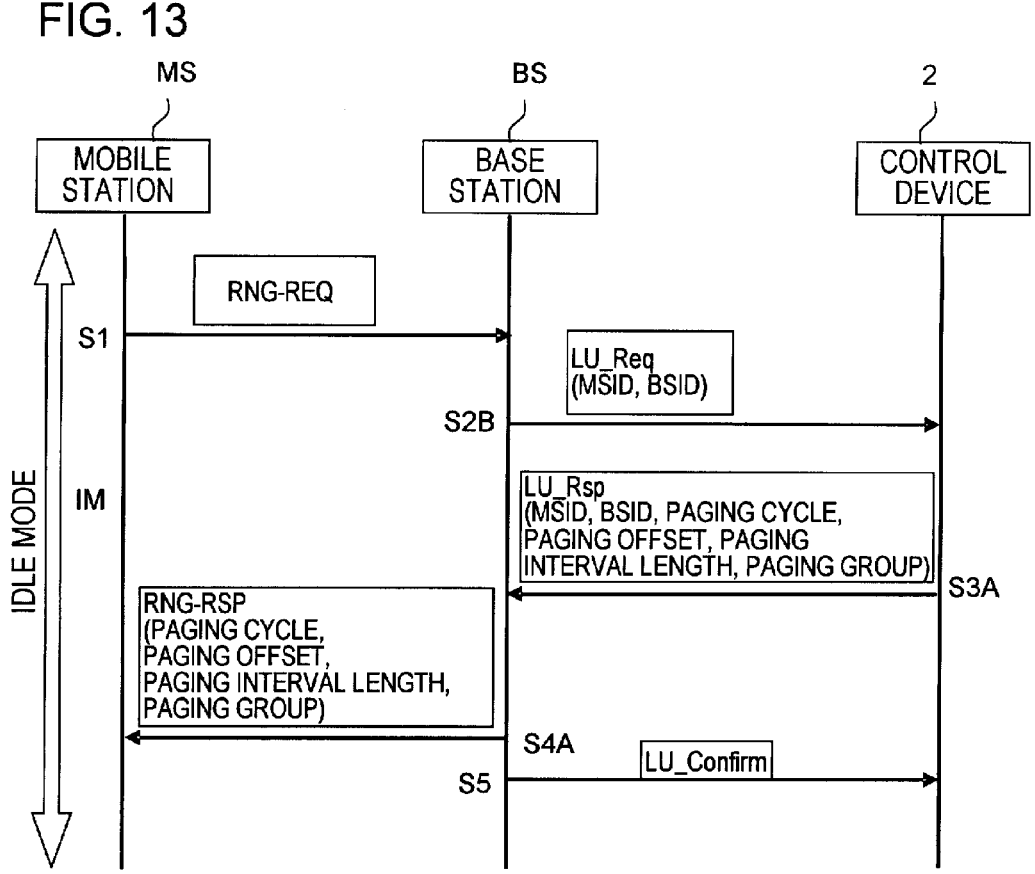
FIG. 13 is a drawing depicting the flow of a paging cycle change request procedure in a third embodiment of the present invention.

FIG. 13 depicts the flow of a paging cycle change request procedure in the third embodiment of the present invention.

The third embodiment differs from the paging cycle change request procedure of the second embodiment (FIG. 11) in that the paging cycle change request message in the form of the ranging message (RNG-REQ) does not contain a paging cycle request.

Since paging cycle change request messages of the current IEEE standard 802.16e are unable to contain paging cycle requests, this eliminates the need to change IEEE standard 802.16e message specifications.

In addition, the paging cycle change request notification message in the form of the LU_Req message transmitted from the wireless base station BS to the control device 2 similarly does not contain a paging cycle request (Step S2B).

The paging information table of this third embodiment is similar to the paging information table of the first embodiment (see FIG. 10), and it is necessary to retain frame length for each mobile station.

The paging cycle changing units 21 and 41 of the present embodiment change the paging cycle using the same procedure as that of the first embodiment (see FIG. 9).

The present embodiment differs from the first embodiment in that the changed paging cycle, paging offset Poff and paging interval length are transmitted to the paging information retention unit 20 and retained by the paging information retention unit 20.

As a result of employing the configuration described above, power consumption and response delay to reception of the mobile station MS can be maintained by changing the paging cycle even if the frame length has been changed in a system in which paging cycle is defined in frame length units.

Next, in a fourth embodiment, a paging cycle conversion method and a group of parameters required by this paging cycle conversion method are able to be dynamically set for each mobile station during idle mode transition, location registration updating and when requesting a change in the paging cycle.

Figure 14:
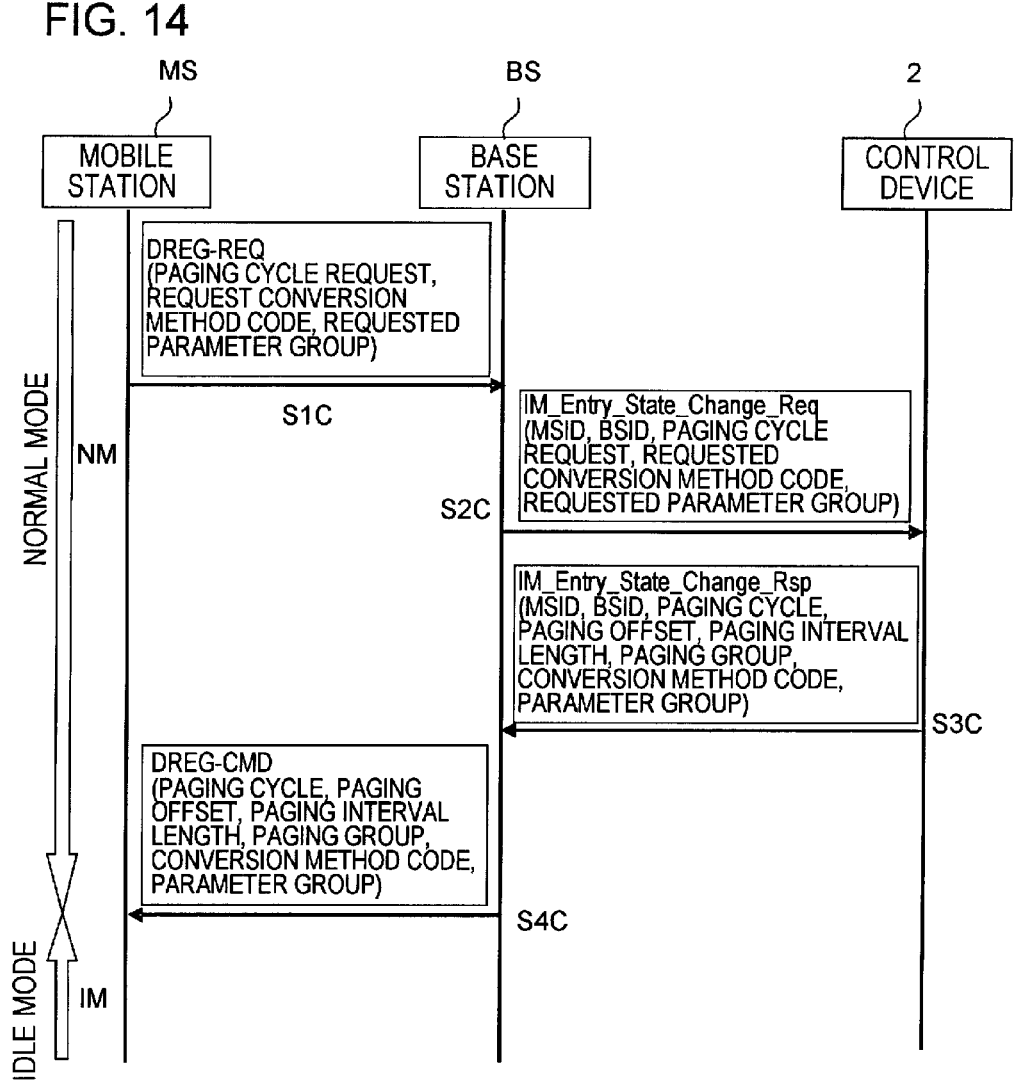
FIG. 14 is a drawing depicting the flow of an idle mode transition procedure of a fourth embodiment of the present invention.

FIG. 14 depicts the flow of an idle mode transition procedure of this fourth embodiment.

Figure 2:
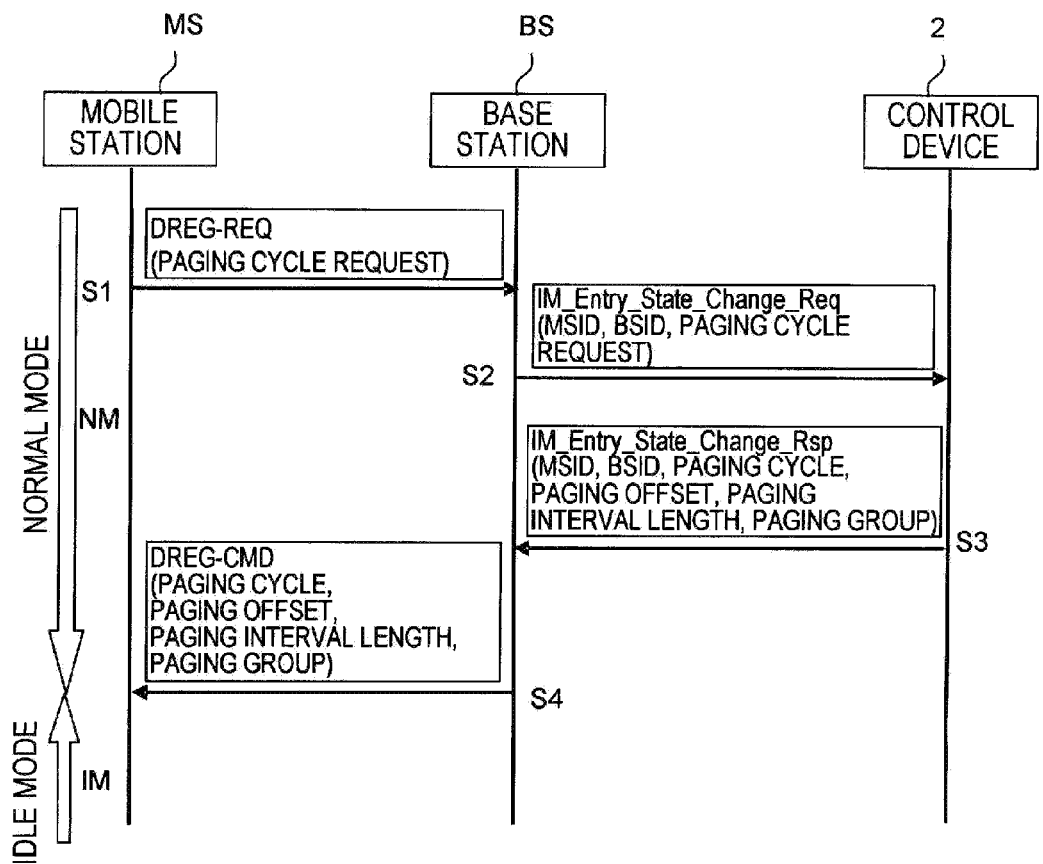
FIG. 2 is a drawing depicting an idle mode transition procedure of the prior art.
Figure 3:
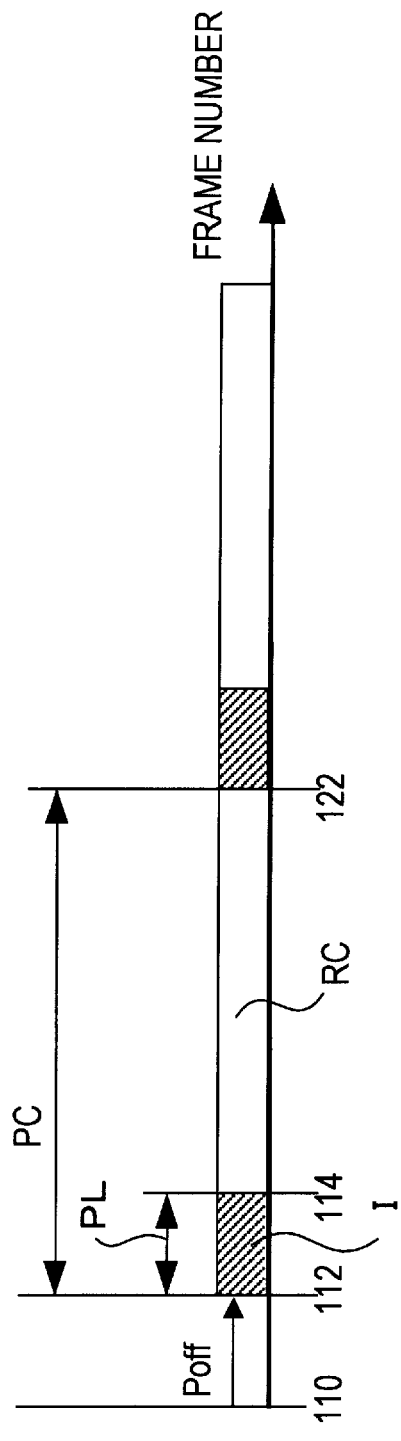
FIG. 3 is a drawing depicting an example of frames targeted for incoming notification monitoring.

The present embodiment differs from an idle mode transition procedure of the prior art (see FIG. 2) in that a requested conversion method code and requested parameter group are transmitted and received between the mobile station MS and the wireless base station BS.

Here, the requested conversion method code is a code that has been assigned to the type of paging cycle conversion method. For example, codes are uniquely assigned for each of the first to third embodiments previously described.

Moreover, the requested parameter group refers to a plurality of parameters required for operating the conversion method. For example, in the paging cycle change procedure of the first embodiment (see FIG. 9), this group of parameters is equivalent to the paging cycle threshold value, minimum paging cycle and minimum paging interval length.

As has been described above, by defining a conversion method code and a parameter group and exchanging this information between the mobile station MS and the wireless base station BS, a paging cycle conversion method and a group of parameters required for that method can be dynamically set for each mobile station.

Furthermore, although FIG. 14 depicts the procedure for idle mode transition, if the conversion method code and parameter group are similarly exchanged between the mobile station MS and the wireless base station BS during location registration updating and when requesting a change in the paging cycle, the paging cycle conversion method and the group of parameters required for that method can also be dynamically set for each mobile station.

In addition, although the request message and response message contain a conversion method code and parameter group in Steps S1C and S4C of FIG. 14, the conversion method code and parameter group may also be only contained in the request message only or in the response message only.

In the case of containing in the request message only, the mobile station MS has the authority to determine the final conversion method code and parameter group. In the case of containing in the response message only, the wireless base station BS or the control device 2 determines the final conversion method code and parameter group irrespective of requests from the mobile station MS. In addition, the request message and the response message may also only contain the conversion method code or the parameter group only.

The above-mentioned embodiment has the effect of being able to maintain power consumption and response delay to reception of the mobile station MS by changing the paging cycle so as to be equal in terms of time units even if frame length changes in a system in which paging cycle is defined by the number of frames.

In addition, the present embodiment also has the effect of being able to maintain power consumption and response delay to reception of the mobile station MS by changing the paging cycle so as to be equal in terms of time units without having to exchange messages between the mobile station MS and the wireless base station BS when frame length has changed in a system in which paging cycle is defined by the number of frames.

The size of a paging information table of the wireless base station BS or the control device 2 can be reduced while maintaining power consumption and response delay to reception of the mobile station MS by exchanging messages between a mobile station and a wireless base station and changing the paging cycle so as to be equal in terms of time units when frame length has changed in a system in which paging cycle is defined by the number of frames.

Moreover, a paging cycle conversion method and group of parameters required for that method can be dynamically set for each mobile station during idle mode transition, location registration and when requesting a change in the paging cycle.

INDUSTRIAL APPLICABILITY

The present invention contributes greatly to power consumption and response delay to reception of a mobile station in a wireless communication system.

What is claimed is:

1. A mobile station comprising:
an incoming notification monitoring unit configured to carry out reception of a notification signal of an incoming call to the mobile station in idle mode by intermittently receiving an incoming notification message broadcast by a wireless base station at each paging cycle, the paging cycle being defined by a number of frames;
a frame length measurement unit configured to detect in the incoming notification message a code for specifying a change in frame length of a reception frame, and to measure frame length as the interval between frame preambles in case the code is absent;
a paging cycle changing unit configured to change the paging cycle for monitoring the notification of an incoming call by increasing the number of frames that defines the paging cycle upon having detected the code indicating that the frame length is changed as shortened, and by decreasing the number of frames that defines the paging cycle in a case of having detected the code indicating that the frame length is changed as lengthened.

2. The mobile station according to claim 1, wherein the cycle changing unit is further configured to transmit a paging cycle request to a wireless base station or a control device managing the base station so that the cycle after the change in frame length is equal in terms of time units to the cycle before the change in frame length in terms of time units when a change in frame length of a reception frame has been detected by the measurement unit, receive an intermittent reception cycle based on the transmitted paging cycle request, and execute a change to the received cycle.

3. The mobile station according to claim 1, wherein
the cycle changing unit is further configured to request a change in the cycle to a wireless base station or control device managing the wireless base station when the change in frame length of a reception frame has been detected by the measurement unit, receive as a response to the request to change the cycle, from the wireless base station or the control device the cycle after the change in frame length to be equal in terms of time units to the cycle before the change in frame length, and execute a change to the received intermittent reception cycle.

4. The mobile station according to claim 1, wherein the cycle changing unit is further configured to transmit to and receive from a wireless base station or a control device managing the wireless base station a code for specifying a conversion method for executing change to the cycle after the change in frame length so as to be equal in terms of time units to the cycle before the change in frame length when a change in frame length of a reception frame has been detected by the measurement unit, and parameters required for the conversion method.

5. The mobile station according to claim 2, wherein
the cycle changing unit is further configured to perform transmission and reception of the paging cycle request between the cycle changing unit and the wireless base station or the control device with a ranging message.

6. The mobile station according to claim 3, wherein
the cycle changing unit is further configured to perform transmission of a request to change the cycle from the cycle changing unit to the wireless base station or the control device, and reception of the intermittent reception cycle from the wireless base station or the control device with a ranging message.

* * * * *